S. R. SMITH & E. MYERS.

SAW-MILL DOG.

No. 183,428.  Patented Oct. 17, 1876.

Attest.
Harry E. Knight
Horace E. Johnson.

Saml. R. Smith
Edward Myers
By Knight Bros. Attys.

UNITED STATES PATENT OFFICE.

SAMUEL R. SMITH AND EDWARD MYERS, OF CINCINNATI, OHIO, ASSIGNORS TO THE LANE & BODLEY COMPANY, OF SAME PLACE.

IMPROVEMENT IN SAW-MILL DOGS.

Specification forming part of Letters Patent No. 183,428, dated October 17, 1876; application filed July 27, 1876.

*To all whom it may concern:*

Be it known that we, SAMUEL R. SMITH and EDWARD MYERS, both of Cincinnati, Hamilton county, Ohio, have invented a new and useful Improvement in Saw-Mill Dogs, of which the following is a specification:

Our improvement consists in a provision which insures the automatic and prompt retraction of a saw-mill dog the instant its point is disengaged from the log.

Figure 1:
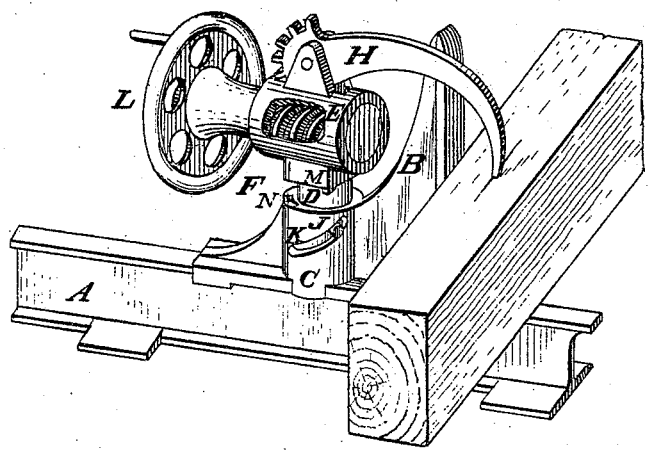
Figure 2:
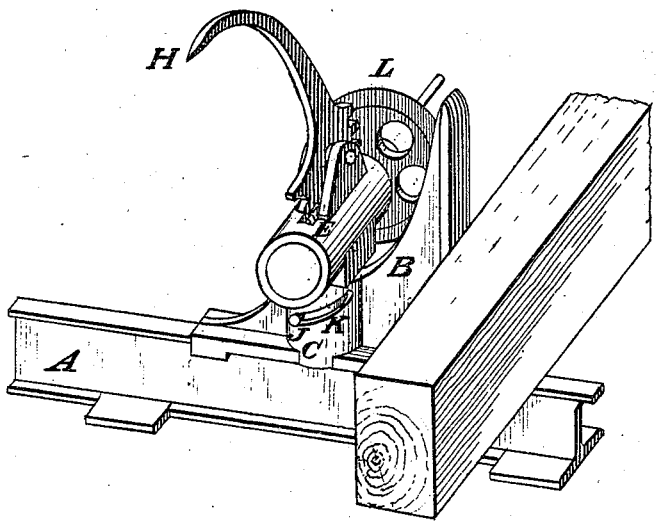

In the accompanying drawings, Figure 1 is a perspective view of our improved dog, represented as engaged in the log. Fig. 2 shows the dog automatically retracted.

A represents a saw-mill head-block of any customary or approved construction. The knee B has a vertical socket, C, for the stem D of a gravitating head-stock, E, which affords a journal-bearing for a worm, F, meshing with a segment-rack, G, on the heel of dog H, said dog being pivoted to the head-block at I. L is a hand-wheel, whereby the worm is manipulated.

The worm and the dog proper, as here illustrated, are substantially similar to those described in the Patent No. 80,514, granted to the said SAMUEL R. SMITH July 28, 1868.

Projecting radially from the stem D is a stud, J, which, occupying a spiral slot, K, in the socket C, coacts with the weight of the dog, on the disengagement of the latter, to give it a partial rotation upon its stem D as an axis, so as to take the position shown in Fig. 2, entirely out of reach of the saw. A spur, M, upon the head-stock, engaging in a notch, N, in the knee, determines the retraction of the head-stock, and relieves the stud J from any shock.

The sawyer is by this means not only relieved of considerable care and labor, but his work is rendered safer, the automatic retraction of the dog removing the liability to destruction of the saw and mutilation of the attendants, which occasionally follows neglect to withdraw the released dog.

The above-described preferred form of our invention may be varied in non-essential particulars; for examples, the stud J and slot K may be duplicated on the other side of the stem, or a steep screw-thread, occupying a corresponding nut or threaded socket, may be substituted for the stud and spiral slot.

We claim as new and of our invention—

A saw-mill dog, which, on its release from the log, becomes automatically retracted by the action of a gravitating head-stock, E, whose stem D occupies a socket, C, and whose stud J occupies a spiral slot or way, K, in the knee, or devices substantially equivalent, for the purposes set forth.

In testimony of which invention we hereunto set our hands.

SAMUEL R. SMITH.
    EDWARD MYERS.

Attest:
 GEO. H. KNIGHT,
 HORACE E. JOHNSON.